UNITED STATES PATENT OFFICE.

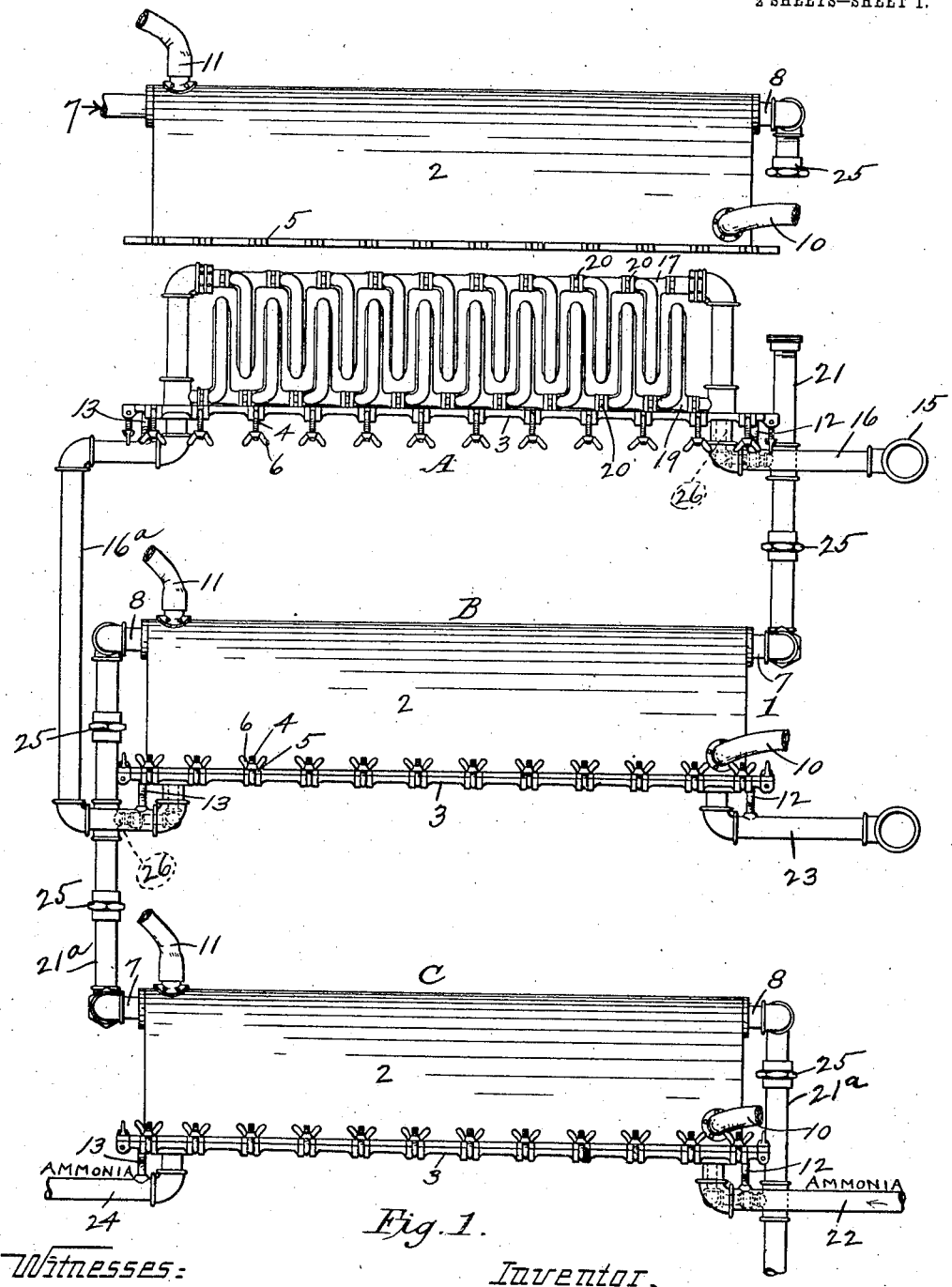

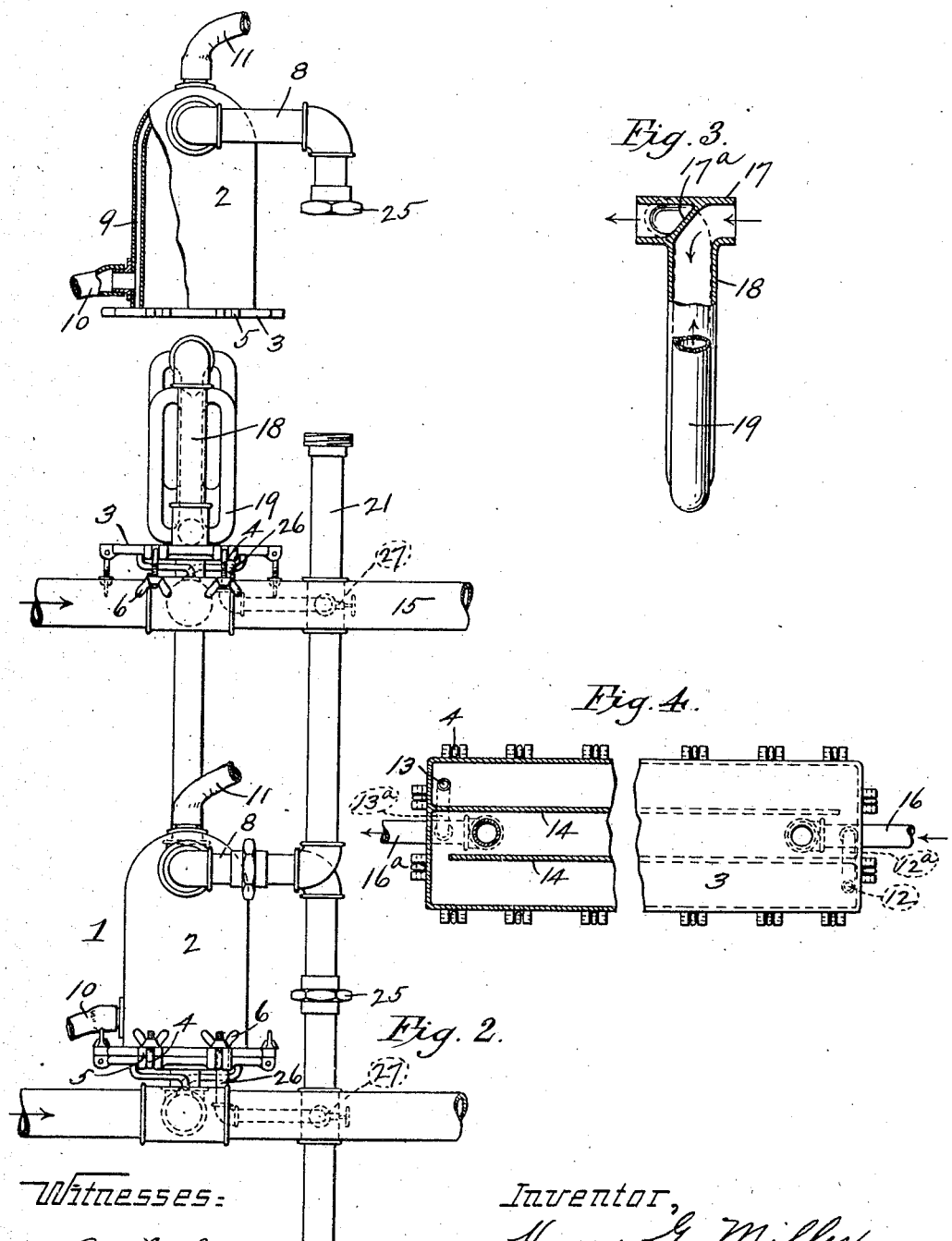

HENRY G. MILLER, OF CLEVELAND, OHIO.

APPARATUS FOR COOLING BEER AND LIKE LIQUIDS.

No. 892,674.  Specification of Letters Patent.  Patented July 7, 1908.

Application filed March 5, 1906. Serial No. 304,255.

*To all whom it may concern:*

Be it known that I, HENRY G. MILLER, a citizen of the United States, residing at Cleveland, in the county of Cuyahoga and State of Ohio, have invented a certain new and useful Improvement in Apparatus for Cooling Beer and Like Liquids, of which the following is a full, clear, and exact description, reference being had to the accompanying drawings.

My invention relates to coolers for liquids and more especially for such coolers as are employed with beer and wort, and has for its object to produce an apparatus for this purpose which will combine maximum cooling efficiency with adaptability and facility of cleaning and simplicity and economy of construction.

Generally speaking, the invention may be defined as consisting of the combinations of elements, for the purposes stated, embodied in the claims hereto annexed.

Referring to the drawings, Figure 1 represents a side elevation of a cooling apparatus constructed in accordance with my invention, the casing of the uppermost cooling element or section being removed to illustrate the construction of the conduits which convey the cooling medium; Fig. 2 represents an enlarged end elevation of two of the tanks shown in Fig. 1; Fig. 3 represents a sectional detail view of one of the circulating elements; and Fig. 4 represents a sectional detail of the base or support for the hood of the casing.

Generally speaking, my invention consists of conduits or distributers through which the cooling medium circulates and a surrounding casing through which the beer or other liquid to be cooled is circulated in contact with said conduits, means being provided for conveniently cleaning and draining the conveyers for both the cooling medium and the medium to be cooled.

Describing the parts by reference numerals, 1 represents a tank or receptacle through which the beer, wort, or other liquid is circulated to be cooled. The tank or receptacle comprises an upper dome or hood-shaped member 2, which forms a cover for a base 3, being detachably secured thereto as by means of bolts 4. These bolts are preferably hinged to the base and may be swung between pairs of lugs 5, projecting from the bottom of the hood, wing nuts 6 being employed for clamping the hood to the base. Each tank is provided near the top of the hood with an inlet 7 and an outlet 8 for the beer or wort. In the drawings, I have shown three tanks or receptacles, A, B, and C, adapted to be connected in series, whereby the beer or wort may flow progressively from one tank to the other to be thoroughly cooled. While this number will be ordinarily sufficient, owing to the great efficiency of the cooling apparatus in each tank, any suitable number may be employed. Each hood 2 is provided with a jacket 9, providing a space through which water or other cooling medium may be circulated, said jacket being provided with an inlet 10 near the bottom thereof and an outlet 11 from the top thereof, the cooling liquid being supplied to the jacket from any desired source. The base 3 is hollow and is provided with a water inlet 12, at one side thereof, and an outlet 13 at the other side. To more effectively extract the heat units from the beer or wort, the water is caused to travel a tortuous course in its passage through the base, as by means of suitable baffles 14.

15 designates a header from which water or other cooling agent is supplied to the apparatus for cooling the beer. From this header extends the supply pipe 16 which passes through the base 3 into the interior of the receptacle formed between the hood 2 and the base 3. Here the water supply is divided between two sets of oppositely located cooling devices or distributers, one set comprising a plurality of circulating elements depending from near the top of the tank and the other set projecting upwardly from near the bottom of the tank, the elements of the two sets being staggered. It will be observed that the width of each element is substantially the same as the width of the casing and that the two branches of the pipe 16 will be located respectively near the top and bottom of the tank. This, with the jacketing of the base and hood and the dimensions and construction of each element and the arrangement of the elements of the two sets, will materially reduce the temperature of the beer in its passage through a tank. The inlet and outlet of the base may communicate with the water supply pipe, as by means of pipes $12^a$ and $13^a$, connected respectively with the pipes 16 and $16^a$.

As will appear more particularly by reference to Figs. 1, 2 and 3, each individual circulating element consists of a short pipe section 17 from which projects a central tube 18 communicating at the end remote from said section with a pair of tubular members 19, substantially parallel therewith, whose combined internal areas is substantially equal to the internal area of the tube 18. In order to cause the cooling medium to flow into the central tube, the pipe section 17 is provided with a transverse web or partition 17$^a$, whereby the cooling medium is directed into the central tube. The return ends of the members 19 communicate with the section 17 on the side of the web or partition opposite the inlet of tube 18, whereby the cooling medium, after circulating through one element, may be delivered into the next adjacent element. Each element is pivotally connected, by means of ball joints 20, with the adjacent element or elements, enabling it to be swung from juxtaposition to the oppositely arranged element or elements. This permits ready access to the cooling elements and enables them to be easily cleaned, as by turning a hose on the same. The number of such elements that will be placed within the tank will be limited only by the length thereof and the thickness of the elements.

Of the three tanks or receptacles shown in the drawings, I have arranged two for the use of water as a cooling medium.

In the operation of the apparatus, beer enters the receptacle through the connection 7 carried by the hood 2 and, as the cooling elements occupy practically all of the transverse space in the tank, it flows into intimate contact with such elements, being further cooled by means of the water jackets in the hood and base. It flows through the outlet 8 into the pipe 21, whence it is conveyed into the next tank below. Then it circulates in the same manner as in the uppermost tank, and, if not sufficiently cooled, may be conducted by a pipe 21$^a$ to the lowermost tank C, which is of identical construction with the tanks A and B, except that the circulating elements in the last mentioned tank are of iron, instead of brass, (as is the case with the tanks A and B) and are supplied with ammonia as a cooling agent through a suitable inlet 22. The water, after flowing through the two series of cooling elements in the tank A enters the pipe 16$^a$ and flows thence through similar series of cooling elements in tank B, being discharged therefrom through the pipe 23.

For convenience of cleaning, the pipes 21 and 21$^a$ and the outlet pipe 21$^a$ from tank C are made in sections, said sections being united by any suitable form of coupling 25. When it is desired to clean the tank and accessories, it is only necessary to disconnect the pipe sections, as indicated in Fig. 1, and lift off the hood 2, whereupon access may be easily had to the water-circulating elements within the tank.

As the inlet and outlet for the beer are located near the top of the hood 2, some means must be provided for draining the tanks or receptacles after each run. For this purpose, I provide a drain pipe 26, extending through the base 3, and having the lower end thereof connected with the pipe 21. By opening a valve 27 (indicated in dotted lines in Fig. 2) the beer remaining in the tank may be withdrawn into the pipe 21$^a$. The inlet and outlet to each hood may be provided with a flexible supply and waste pipe, whereby the removal of the hood is not interfered with.

By the construction herein described, I have provided, in comparatively small space, a very large cooling surface for the beer or other liquid to be cooled. By circulating through the tanks A and B, wort, which is introduced into the former tank at a temperature of about 212°, can be cooled to within four or five degrees of the temperature of the water within the latter tank. The tank C may be employed for cooling beer which may be supplied thereto from the fermenting cellar, or it may be employed with the tanks A and B to cool the wort. In the latter case, the tanks A and B serve to reduce the temperature of the wort to a degree which will permit the ammonia supplied to tank C to be efficient in the further reduction of its temperature.

A marked advantage of my invention resides in the fact that the wort or beer is shut in from contamination by the air in its transit through the coolers, is aerated in transit, and leaves the tanks in proper condition to be conveyed to the fermenting cellar.

In the embodiment of my invention herein disclosed, I have necessarily gone into details of construction, but it will be apparent that such details may be departed from more or less without avoiding the spirit of my invention. Hence I do not propose to be limited to such details, except as the same may be positively included in the claims hereto annexed, or may be rendered necessary by the prior state of the art.

Having thus described my invention, I claim:—

1. In an apparatus for cooling beer and the like, the combination of a receptacle having a double wall, a distributer for fluid in said receptacle and extending from end to end thereof, connections for circulating a fluid through said distributer, connections for circulating another fluid through said receptacle and in contact with said distributer and in a direction contrary to the general direction of the flow of the fluid through said distributer, and connections for circulating fluid through the space formed between the double walls of the receptacle, substantially as specified.

2. In an apparatus for cooling beer and the like, the combination of a receptacle having a hollow base and provided with an inlet and an outlet for circulating a fluid therethrough, a distributer within said receptacle, an inlet pipe communicating with one end of said distributer, an outlet pipe communicating with the other end of said distributer, and branch pipes communicating with the inlet and outlet pipes and with the hollow base, substantially as specified.

3. In an apparatus for cooling beer and the like, the combination of a receptacle having a hollow base provided with a tortuous passageway therein, connections for circulating a fluid through said receptacle, a distributer for another fluid in said receptacle, an inlet pipe communicating with one end of said distributer, an outlet pipe communicating with the other end of said distributer, a pipe connecting said inlet pipe with one end of the tortuous passageway in said base, and a pipe connecting the outlet pipe with the opposite end of said tortuous passageway, substantially as specified.

4. In a cooling apparatus, the combination of a tank or receptacle, connections for circulating a fluid therethrough, and a distributer for another fluid within said tank or receptacle, said distributer comprising an inlet pipe entering said tank, said pipe being branched within the tank, the branches merging into a common outlet pipe, and distributing elements projecting from each branch toward the other branch, substantially as specified.

5. In a cooling apparatus, the combination of a tank or receptacle, of a distributer for fluid therein, said distributer comprising a branched circuit and a plurality of circulating elements projecting from each branch of said circuit toward the other branch, the elements of one branch overlapping and being staggered with respect to those of the other branch, and said elements being swiveled, substantially as specified.

6. A distributer for a fluid cooler, said distributer comprising a branched circuit and a plurality of circulating elements projecting from each branch of said circuit toward the other branch, the elements of one branch overlapping and being staggered with respect to those of the other branch, and said elements being swiveled, substantially as specified.

7. A circulating element for cooling apparatus, said element comprising a pipe section having at one end an inlet and at the other end an outlet, a partition intermediate of the inlet and outlet, a central tube communicating with said pipe section on one side of said partition, and lateral tubes each communicating at one end with the end of said central tube which is remote from said section; and at the other end with the section on the side of the partition opposite the point of connection of the central tube with said section, substantially as specified.

8. A cooling apparatus comprising two series of cooling elements, the elements of one series projecting toward those of the other series and being staggered therewith, said elements being swiveled whereby they may be rotated or swung out of the way of the other elements to permit access thereto, substantially as specified.

9. In an apparatus for cooling beer and like liquids, the combination of a tank having a double-walled base, baffle plates extending between the walls of the base and from opposite ends thereof to provide a tortuous passageway, a cooling device in said tank, an inlet and an outlet pipe for said cooling device, and pipes connecting said inlet and outlet pipes with diagonally opposite corners of said hollow base, substantially as specified.

10. In an apparatus for cooling beer and the like, the combination of a receptacle, means for circulating a fluid through said receptacle, and a distributer for another fluid in said receptacle, said distributer comprising a branched conduit, circulating elements projecting from each conduit and being staggered with respect to the elements projecting from the other conduit, and ball joints connecting the circulating elements of each conduit, substantially as specified.

11. In an apparatus for the purpose specified, the combination of a receptacle and a distributer therein comprising a plurality of distributing elements, each element consisting of a tubular section having a partition extending across the same, a tube communicating with said section on one side of said partition and projecting from said section, and side tubes each having one end connected to the end of the former tube at a point remote from said section and the other end connected to said section on the opposite side of the partition from the former tube, the area of the former tube being equal to the combined areas of the other two tubes, substantially as specified.

12. In an apparatus for the purpose specified, the combination of a receptacle and a distributer therein comprising a plurality of distributing elements, each element consisting of a tubular section having a partition extending across the same, a central tube communicating with said section on one side of said partition and projecting from said section, and side tubes each having one end connected to the end of the former tube at a point remote from said section and the other end connected to said section on the opposite side of the partition from the former tube, the area of the former tube being equal to the combined areas of the other two tubes, said central and side tubes projecting at right angles to said section, substantially as specified.

13. In an apparatus for the purpose specified, the combination of a receptacle, connections for circulating a fluid longitudinally thereof and a distributer for another fluid therein, said distributer extending longitudinally of said receptacle and comprising a series of connected distributing elements, each element consisting of a tubular section having a partition extending across the same, a central tube projecting from said section and at substantially right angles thereto, and side tubes each communicating at one end with the end of the central tube which is remote from the section and at the other end with the section on the opposite side of the partition from the connection of the central tube therewith, said tubes being in substantially the same plane, substantially as specified.

14. In an apparatus for cooling beer and the like, the combination of a receptacle comprising two sections detachably connected, a distributer therein comprising two series of swiveled distributing devices, the devices of one series overlapping and being staggered with respect to the devices of the other series, substantially as specified.

15. In a cooling apparatus, the combination of a casing for the reception of a fluid and a distributer for another fluid therein, said distributer comprising a plurality of circulating elements connected in series, each element consisting of a central tube and side tubes communicating with said central tube, the combined areas of said side tubes being substantially equal to the area of the central tube, substantially as specified.

16. In a cooling apparatus, the combination of a casing for the reception of a fluid and a distributer for another fluid therein, said distributer comprising a plurality of circulating elements connected in series, each element being arranged transversely to the length of the receptacle and comprising a central tube and side tubes communicating with said central tube, the side tubes of one element being connected with the central tube of the next element, substantially as specified.

In testimony whereof, I hereunto affix my signature in the presence of two witnesses.

HENRY G. MILLER.

Witnesses:
E. H. CROFT,
J. B. HULL.